Oct. 11, 1927.

G. C. HALEY 1,645,483

WEEDER AND CULTIVATOR

Filed Sept. 20, 1926

G. C. Haley
INVENTOR

BY Victor J. Evans
ATTORNEY

Patented Oct. 11, 1927.

1,645,483

UNITED STATES PATENT OFFICE.

GROVER C. HALEY, OF CYNTHIANA, KENTUCKY.

WEEDER AND CULTIVATOR.

Application filed September 20, 1926. Serial No. 136,637.

My present invention has reference to a toothed cultivator and weeder.

In gang cultivators, especially where V-shaped cultivator frames are employed the cultivator teeth on one of the frames are apt to bite into the ground to a greater extent than those on the other cultivator frame, with the result that the machine cannot be properly propelled in a straight ahead direction and it may, therefore, be considered the object of this invention to provide means whereby a cultivator may be properly directed in its course regardless of ground conditions or regardless of the biting effect of the teeth of one cultivator with respect to the biting effect of the teeth of the second cultivator of the gang.

A further object is the provision of a means for this purpose which is of an extremely simple construction and which may be readily applied to the ordinary type of wheeled cultivators.

To the attainment of the above broadly stated objects and others which will present themselves as the nature of the invention is better understood, the improvement further resides in certain novel features of construction, combination and operative association of parts, a satisfactory embodiment of which is disclosed by the accompanying drawing.

Figures 1, 2:
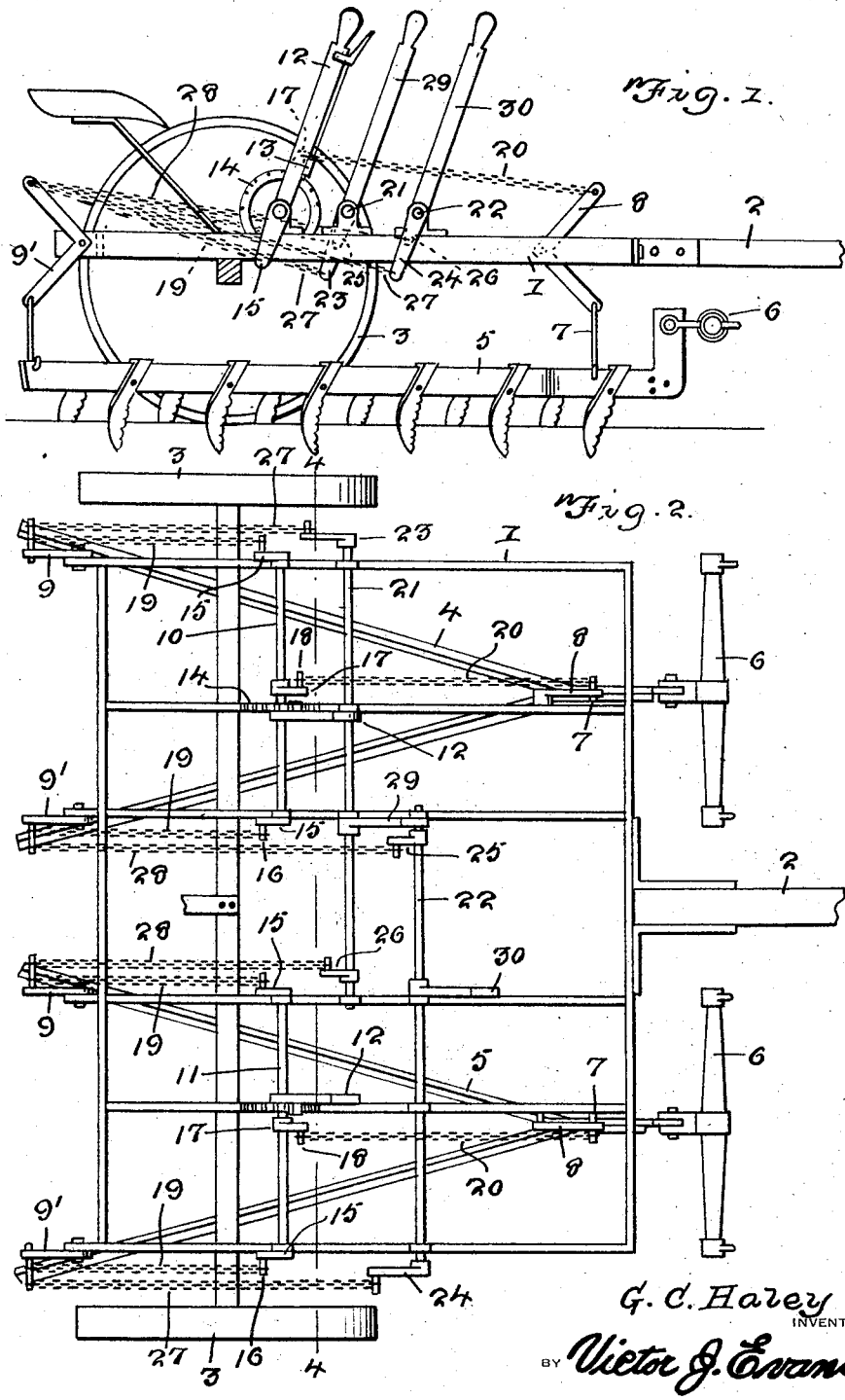
Figure 1 is a side elevation of my improvement.
Figure 2 is a top plan view thereof.
Figure 3:
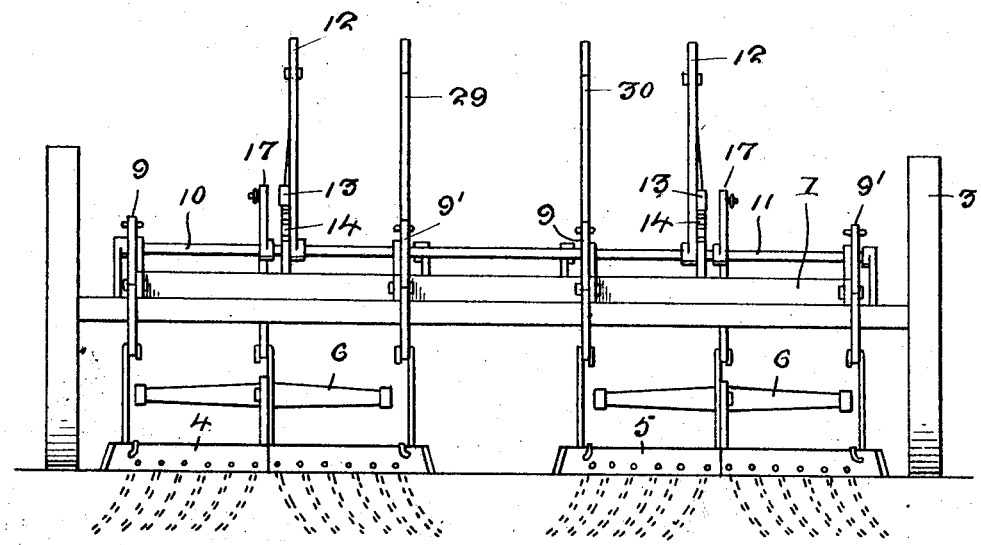
Figure 3 is a rear elevation thereof.
Figure 4:
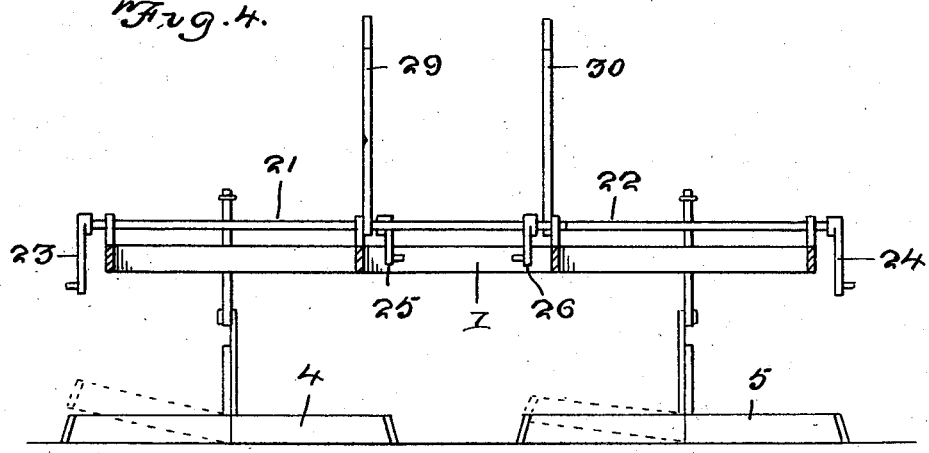
Figure 4 is a sectional view approximately on the line 4—4 of Figure 2.

The main frame of the improvement is indicated by the numeral 1. This frame has at its forward end the usual tongue 2 and is mounted on ground wheels 3. The frame is of a substantially rectangular construction being preferably made up of suitably connected bars and supported from the main frame there are the cultivator frames. In the present instance two cultivator frames are illustrated, each of the said frames being suitably spaced and each providing a substantially V-shaped body. The angle arms of the cultivator frames 4—5 have fixed thereon a particular and peculiar construction of teeth which form the subject matter of my co-pending application Serial No. 119,739, filed on the 30th day of June, 1926, and therefore will not be alluded to in detail. The upstanding straight ends of the cultivator frames have attached thereto the single trees 6 for the draft animals and the cultivator frames at their front and rear ends are supported from the main frame 1 through the medium of links 7 which are connected to the lower arms of oppositely arranged bell crank levers 8 and 9—9. Journaled in suitable bearings forward of and to the opposite sides of the driver's seat of the wheeled frame there are transversely arranged shafts 10 and 11 respectively. Fixedly secured to each of these shafts there is an operating lever 12. Each operating lever is provided with the spring influenced handle operated dog 13 to engage in a rack 14 that is suitably supported on the frame 1. The ends of the shafts 10 and 11 may be cranked and may have secured thereto arms 15 having pin extensions 16. In addition to these arms and pins there is fixed adjacent to the center of each shaft 10 and 11 an arm 17 having an offset pin 18. Secured to the pins 16 and 18 there are oppositely directed flexible elements which are preferably in the nature of chains 19 and 20. The chains 19 are secured to offset elements or pins on the upper arms of the bell crank levers 9, while the chain 20 is likewise secured to the upper arm of the bell crank lever 8. Thus by operating either of the levers 12, either of the frames 4 or 5 may be bodily raised with respect to the wheeled or main frame 1 and likewise the said frames may be lowered and the teeth thereon held in ground engagement.

Journaled in suitable bearing openings on the frame, preferably forward of the shafts 10 and 11 there are other shafts 21 and 22. By reference to Figure 2 of the drawings it will be noted that the inner ends of the shafts 21 and 22 extend in opposite directions beyond the center of the main frame 1 and that the outer ends of the shafts are cranked or may be provided with arms 23 and 24 which are of a greater length than similar cranks or arms 25 and 26 that are fixed on the inner ends of the said shafts. The arms 24 and 25 each have angle extensions to which are fixed flexible elements preferably in the nature of chains. The chains for the longer arms 23 and 24 are indicated by the numeral 27 and are secured to the pin or offset end on the outer and rear bell crank levers 9', while the chains 28 for the inner and shorter arms 25 and 26 are connected to the offset ends of the inner bell crank levers 9.

On each of the shafts 21 and 22 there is fixed an operating lever designated by the numerals 29 and 30, respectively. Should the teeth on either of the sides or beams of the frames 4 and 5 dig deeper into the ground than the remaining teeth so as to influence the travel of the cultivator beyond a straight ahead direction it is merely necessary to exert a pull upon either of the levers 29 or 30 which will cant and swing the said frames to bring the teeth on the said beam partly out of the ground and to lower the teeth of the second beam into the ground, with the result that a slight manipulation of the levers under such conditions will cause the frame to travel in a straight ahead direction. The lever 12 is operated when an obstruction is met and it is thought the foregoing will fully set forth the simplicity of the construction and the advantages thereof. Obviously I do not wish to be restricted to the precise details herein set forth and therefore hold myself entitled to make such changes therefrom as fairly fall within the scope of what I claim.

Having described the invention, I claim:—

In a gang toothed cultivator, a wheeled supporting frame, angle tooth carrying frames below the supporting frame and to which the draft animals are attached, forward and rear bell crank levers pivoted to the supporting frame, links connecting the lower arms of the levers with the inner and angle ends of the harrow frames, shafts having central cranks and cranked ends, flexible elements connecting the end cranks with the rear bell crank levers, flexible elements connecting the central cranks with the forward bell crank levers, an operating lever for each of said shafts, other shafts journaled in bearings on the main frame forward of the first mentioned shafts, each of the last mentioned shafts having cranked ends, the outer cranks being of a greater length than the inner cranks, flexible connections between these cranks and the rear bell crank levers and an operating lever for each of the last mentioned shafts.

In testimony whereof I affix my signature.

GROVER C. HALEY.